United States Patent [19]

Hunter

[11] Patent Number: 5,127,209

[45] Date of Patent: Jul. 7, 1992

[54] MULTI-PURPOSE STACKER WITH OVERLAPPING MATERIAL HANDLING DEVICES

[75] Inventor: Stefan A. Hunter, Kaukauna, Wis.

[73] Assignee: Kimberly-Clark Corporation, Neenah, Wis.

[21] Appl. No.: 616,441

[22] Filed: Nov. 15, 1990

[51] Int. Cl.⁵ .................................................. B65B 1/24
[52] U.S. Cl. .................................... 53/439; 53/529; 198/419.3; 198/484.1; 198/570; 271/315; 271/203
[58] Field of Search .................. 271/315, 202, 203; 198/419.3, 484.1, 570, 803.1, 803.13; 53/439, 529

[56] References Cited

U.S. PATENT DOCUMENTS

| | | | |
|---|---|---|---|
| 1,443,104 | 1/1923 | Wagner et al. | 198/484.1 |
| 1,562,560 | 11/1925 | Hormel | 198/484.1 |
| 1,810,859 | 6/1931 | Thurmer | 198/803.13 |
| 1,815,372 | 7/1931 | Frazier . | |
| 1,853,478 | 4/1932 | Vincent | 198/484.1 |
| 2,923,392 | 2/1960 | Gabrielsen | 194/2 |
| 3,395,786 | 8/1968 | Rosema | 198/484.1 |
| 3,409,115 | 11/1968 | Porcaro | 198/24 |
| 3,775,938 | 12/1973 | Sutphin | 53/164 |
| 3,902,587 | 9/1975 | Checcucci | 198/419.3 |
| 4,018,031 | 4/1977 | Smaw | 53/159 |
| 4,141,193 | 2/1979 | Joa | 53/529 |
| 4,180,154 | 12/1979 | Andersson | 198/466 |
| 4,250,688 | 2/1981 | Lingenfelder | 53/438 |
| 4,307,800 | 12/1981 | Joa | 198/374 |
| 4,325,475 | 4/1982 | Spalding | 198/429 |
| 4,353,276 | 10/1982 | Ackerfeldt | 198/570 |
| 4,399,905 | 8/1983 | Lance et al. | 198/422 |
| 4,523,671 | 6/1985 | Campbell | 198/422 |
| 4,577,453 | 3/1986 | Hofeler | 53/438 |
| 4,768,642 | 9/1988 | Hunter | 198/425 |

FOREIGN PATENT DOCUMENTS 0101144 2/1984 European Pat. Off. .
2155886A 10/1985 United Kingdom .

Primary Examiner—Robert P. Olszewski
Assistant Examiner—Steven M. Reiss
Attorney, Agent, or Firm—Thomas J. Connelly

[57] ABSTRACT

A conveyor system is disclosed having two independent conveyor belts which travel along the same path at various speeds. Each conveyor belt has at least one set of material handling platens attached thereto. Product is fed into the space between each pair of platens and is transported to a distal location where it is removed. A control mechanism operates the two conveyor belts such that product can be loaded into one set of platens at one speed, while product already loaded into another set of platens on the other conveyor belt can be transported and unloaded at a different rate.

26 Claims, 10 Drawing Sheets

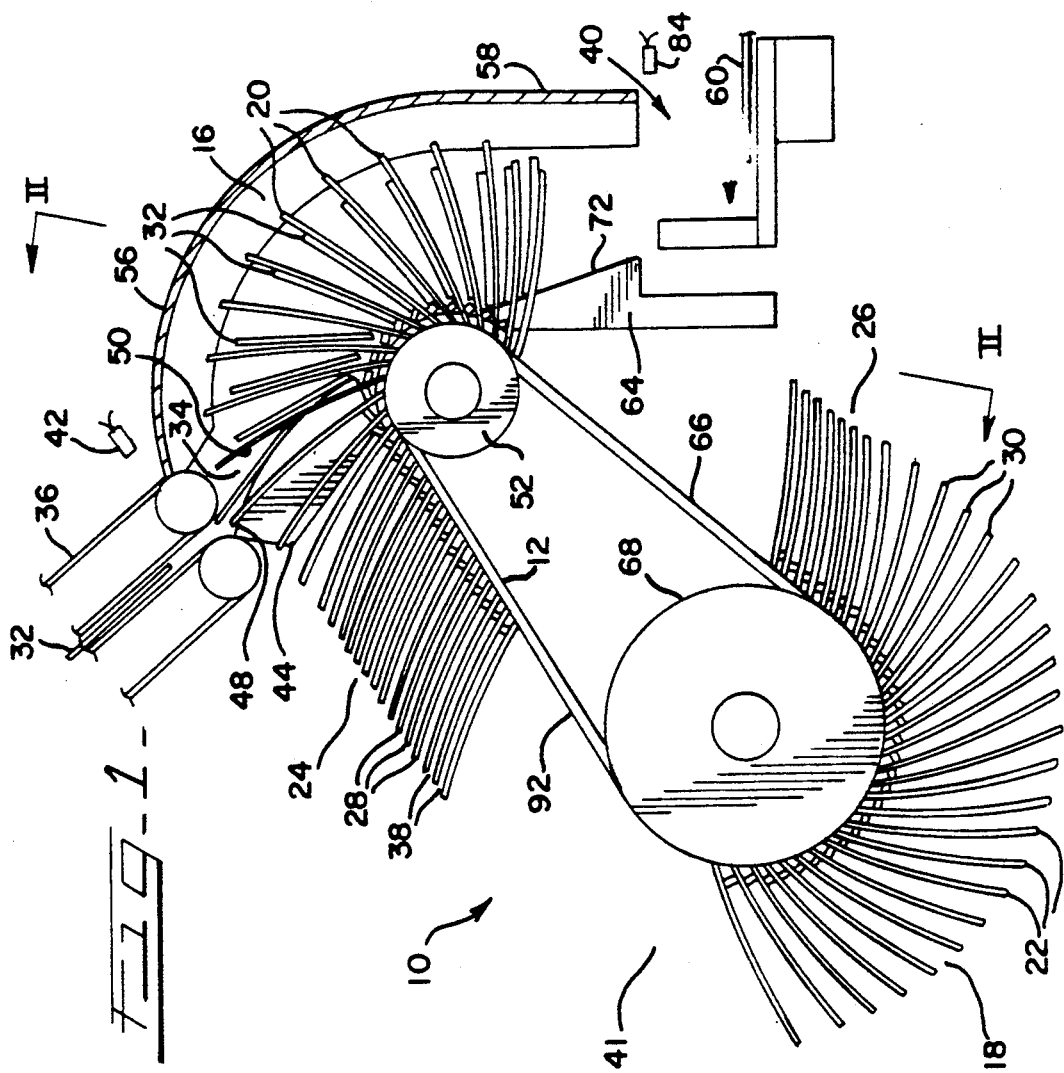
FIG-1-
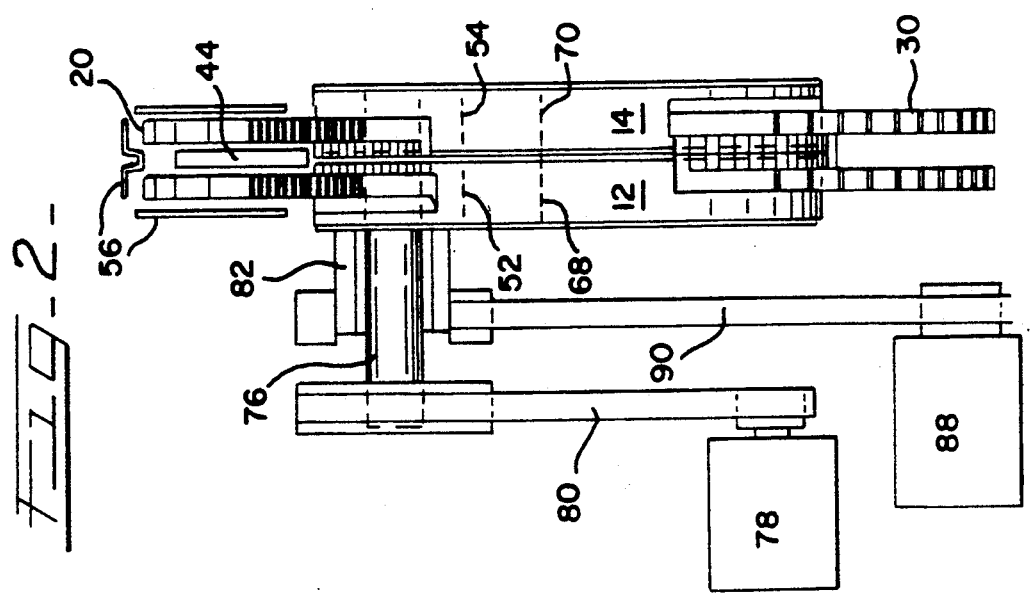
FIG-2-

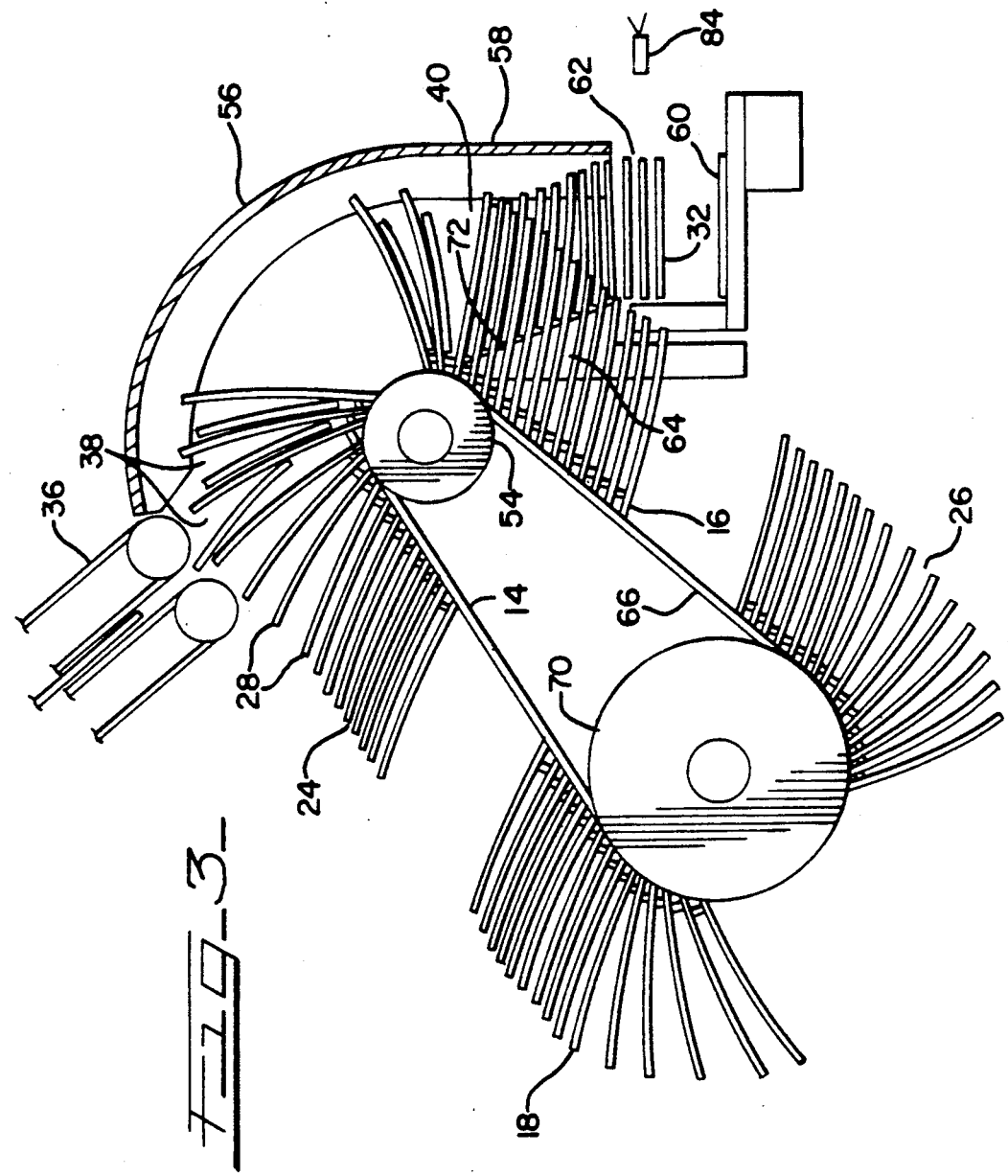

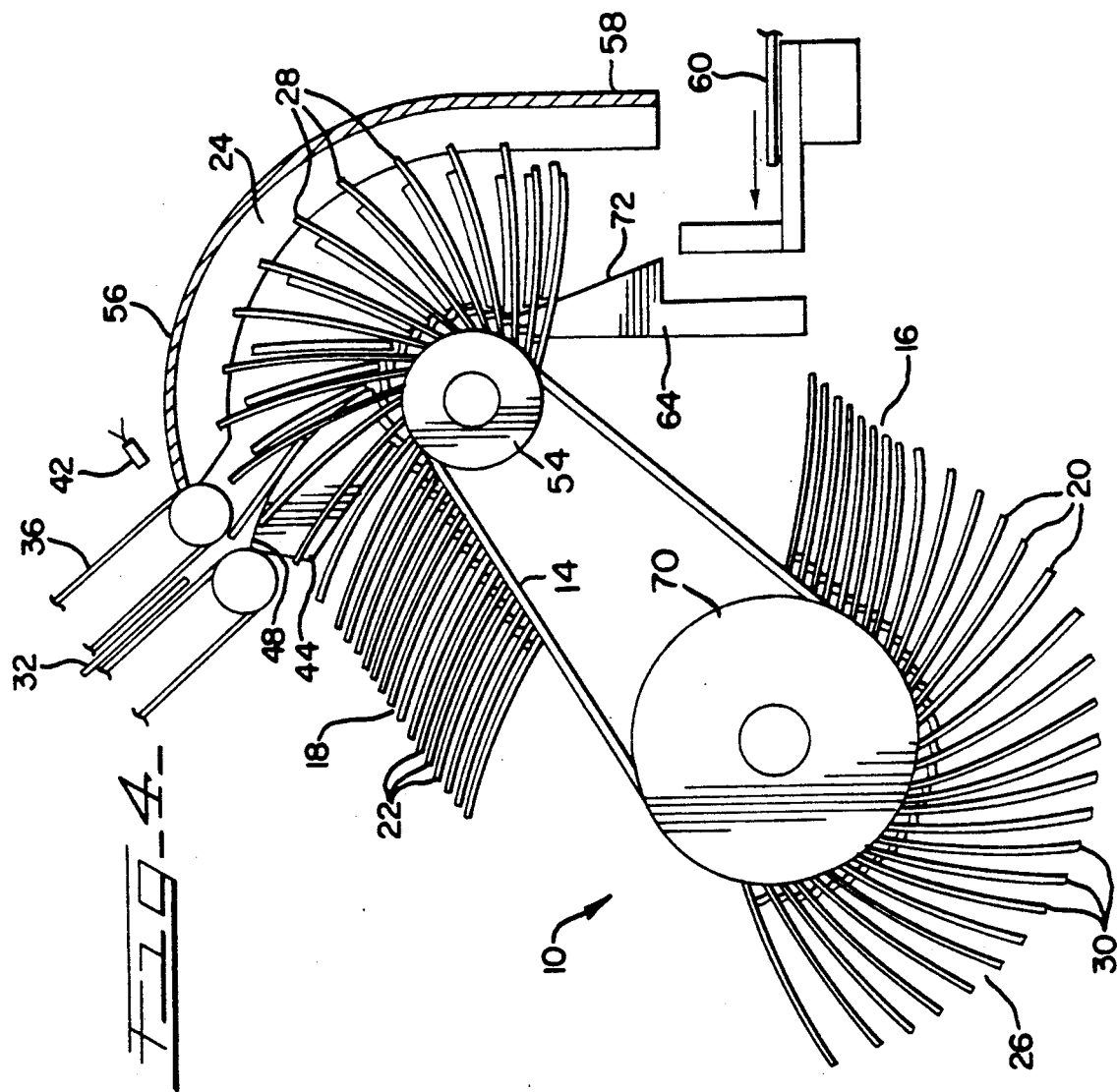

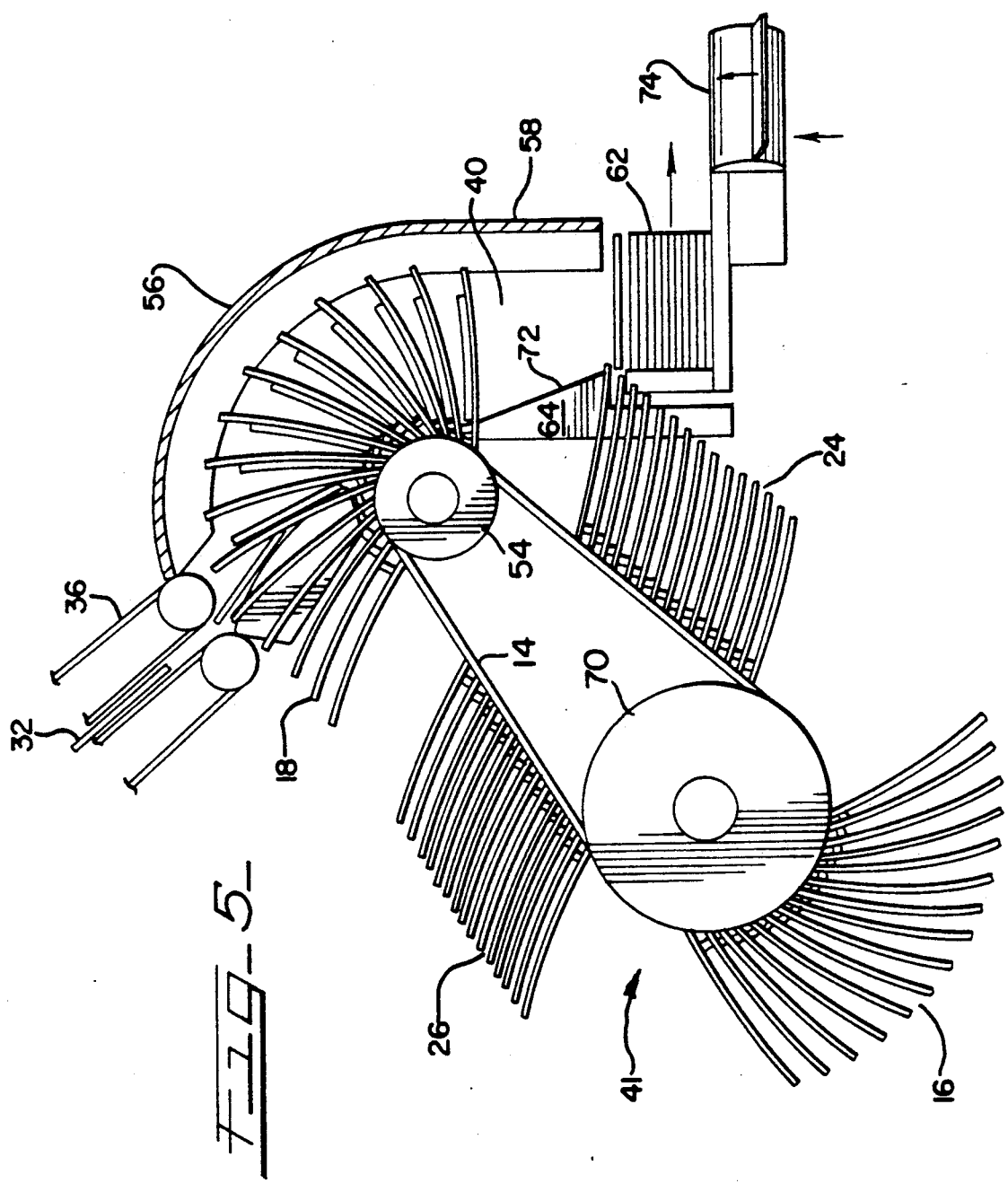

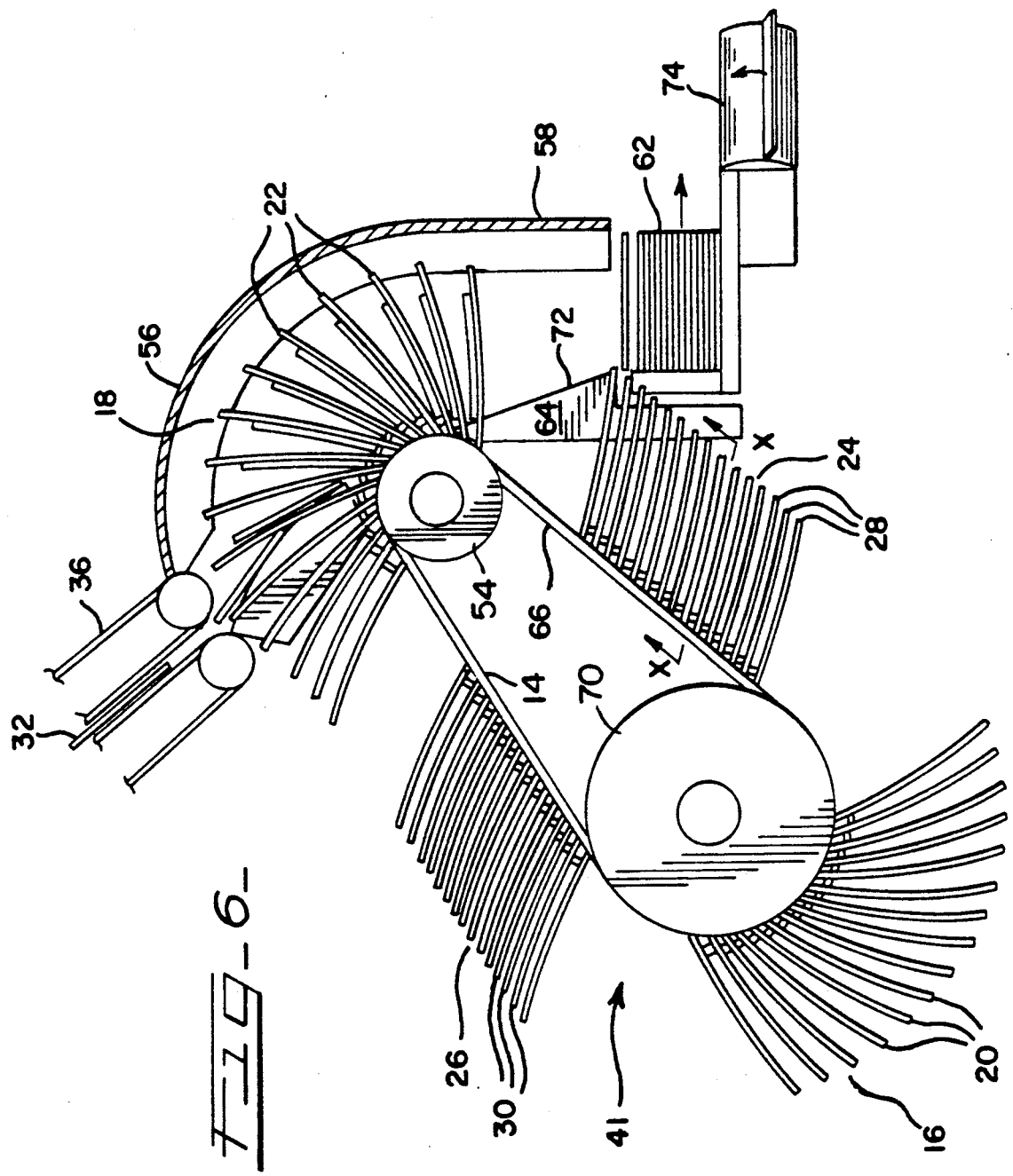

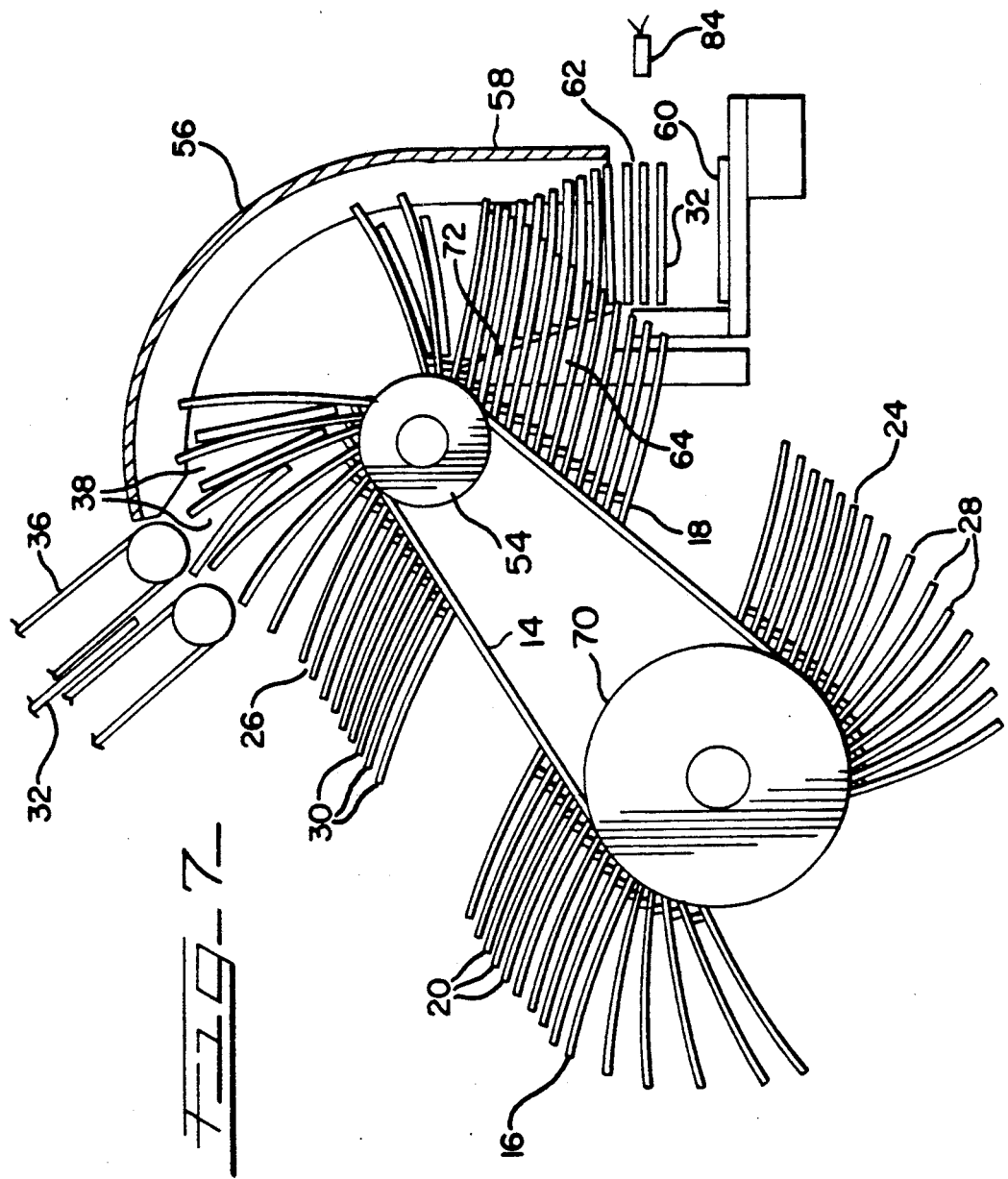

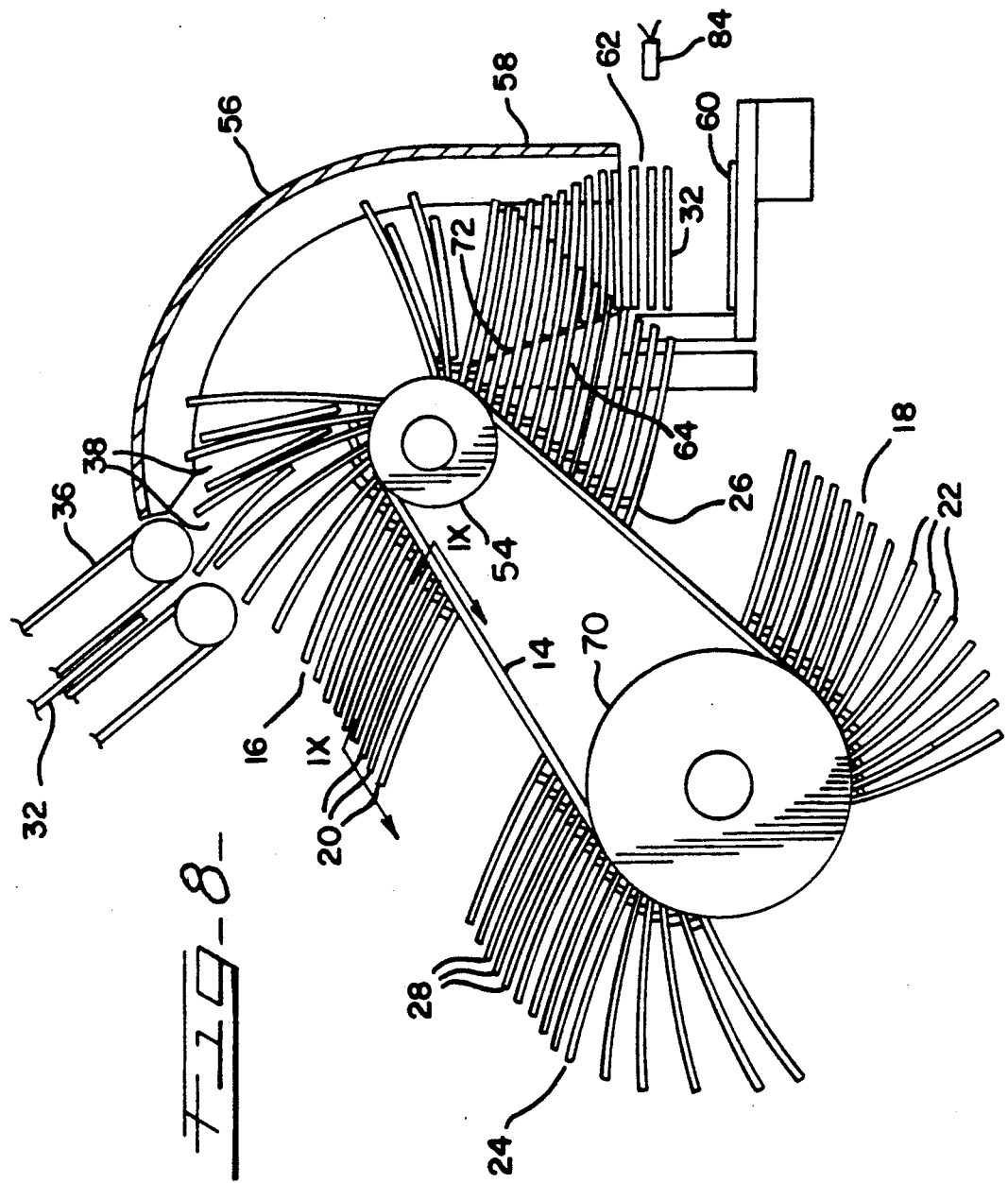
FIG-8-

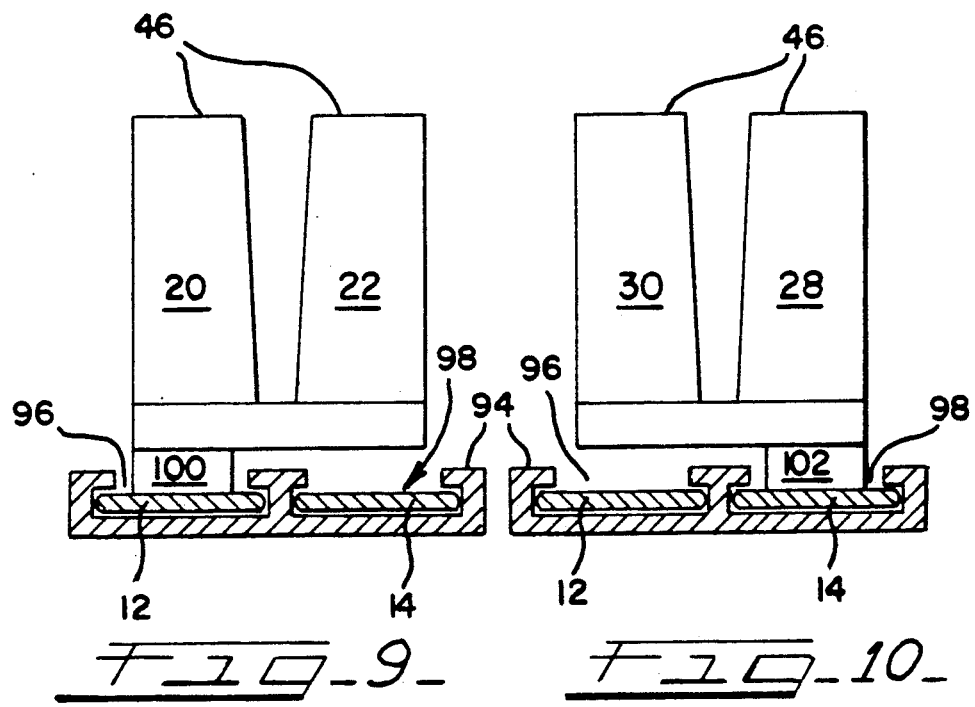

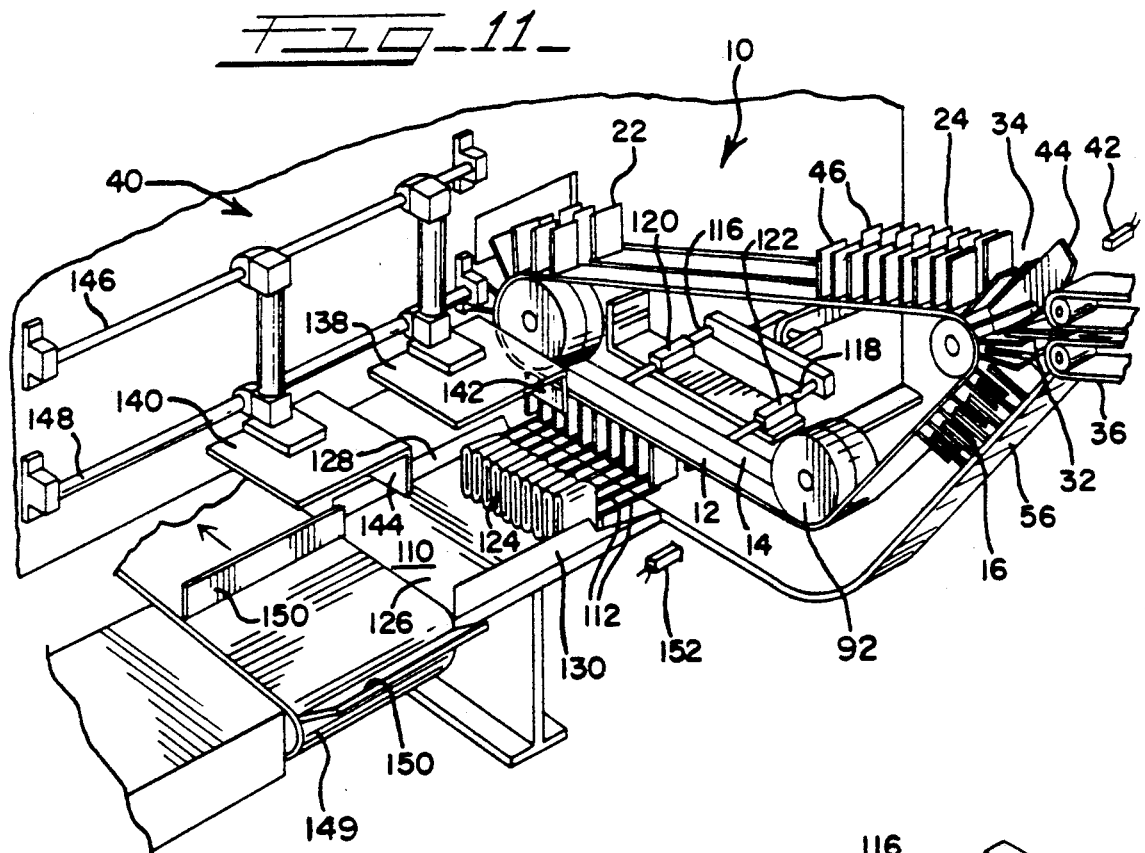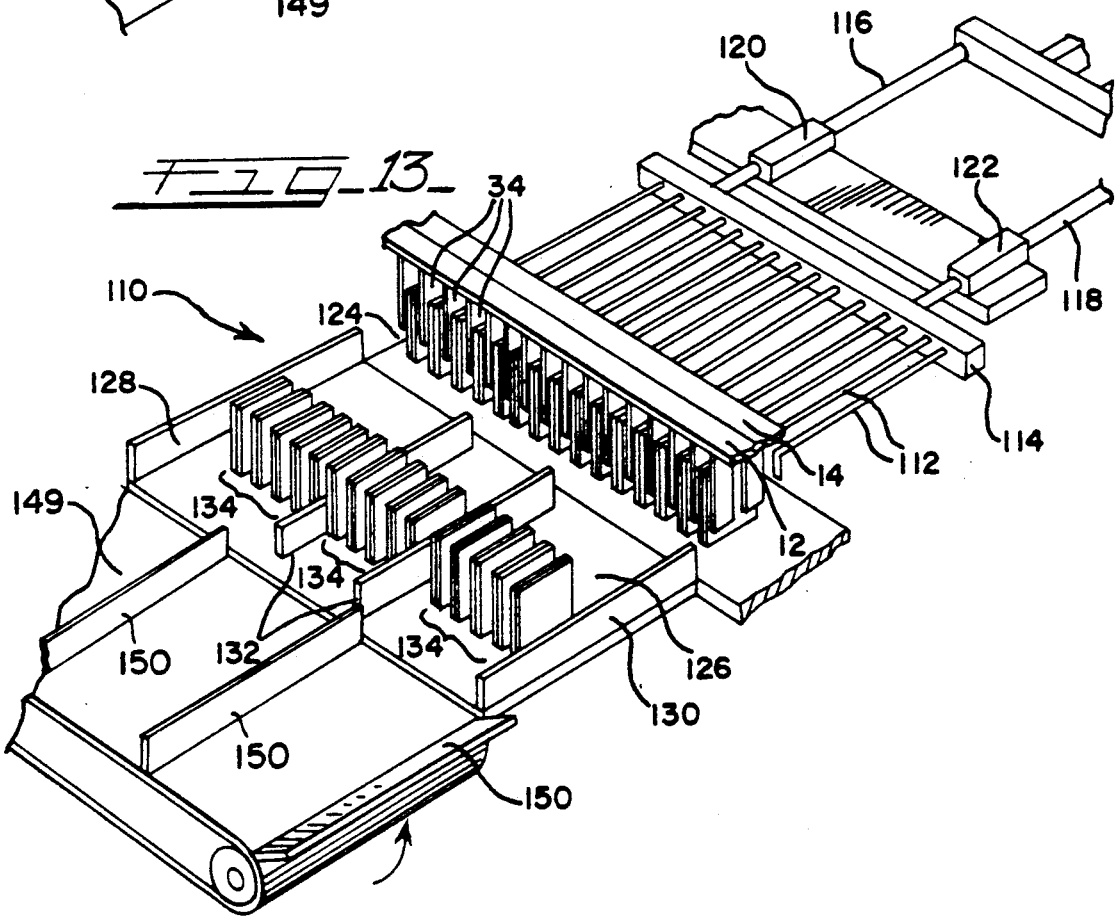

MULTI-PURPOSE STACKER WITH OVERLAPPING MATERIAL HANDLING DEVICES

FIELD OF THE INVENTION

The invention relates to a high-speed conveyor system having multiple conveyor belts arranged such that material handling devices mounted on different conveyor belts travel in the same path, but may move at different speeds when conveying materials from a common loading place to unloading sites.

BACKGROUND OF THE INVENTION

In commercial production, particularly of consumer products, machines for manufacturing the products operate at very high speeds and rapidly delivery enormous quantities of finished products. These products then must be separated into counted groups and packaged. Often the apparatus for grouping and packaging is unable to handle products as rapidly as they are produced. Therefore, it is often necessary to divide the output from a single machine into several lines for counting and packaging, requiring expensive duplication of equipment. Therefore, it is desirable that the conveying system handle all the output with a single loading place and unloading site for delivery to a packaging machine such as a bagger or cartoner. However, apart from the problems above, another difficulty is that the manufactured products are produced one at a time at a constant speed, whereas typical packaging machines require counted groups of products suitable for packaging. Therefore, the conveyor system should be able to gather single products continuously but be able to unload groups of the gathered products at varying speed.

In the manufacture of feminine care pads, the pads are commonly wrapped in individual polymer film wrappings, and then wrapped pads are commonly packaged in polymer bags or cartons. For efficient packaging and shipping, the products need to be compressed. Thus, an additional complication is that the pads generally need to be compressed after removal from the individual packaging machine and before being placed in consumer package. Therefore, such a conveyor system should be able to receive the individually wrapped napkins one at a time, unload them in groups for packaging, and compress the groups of individual packages by a satisfactory amount for placement into the consumer package. Other feminine care products, such as wrapped tampons and unwrapped pads, do not require compression but do require high-speed handling, counting and packaging.

Prior conveying systems have not been required to meet all these needs and additionally operate at a high speed.

U.S. Pat. No. 4,768,642 issued to Stefan A. Hunter and assigned to the present assignee discloses an apparatus with two conveyor belts carrying material handling devices. For at least a portion of their travel, the handling devices travel in the same track or path, although they are attached to separate conveyor belts that travel parallel with each other. This apparatus cannot handle product at ultra-high rates, provides only horizontal groups for use with a bagger and has a relatively narrow angle at which it can accept product.

U.S. Pat. No. 4,577,453 issued to Henry H. Hofeler discloses an apparatus which forms and compresses multi-stack arrays of compressible, generally flat articles on a receiving platform. This apparatus discloses only vertical stacking suitable for cartons. Now, a conveyor system and method have been developed which can form vertical stacks or horizontal groups of products and can accept product from a variety of angles at ultra-high speed.

SUMMARY OF THE INVENTION

This invention is an apparatus for collecting products which includes at least two continuous conveyor belts, each conveyor belt having at least one set of material handling means that are moved along the same path. Each conveyor belt has independent drive means for moving independently of the other. A feed means deposits one or more products into the space between material handling means in which the products are carried. Entering product contacts a curved guide means at an acute angle which thereby slows down the product. At a location displaced from the feed means, a removal means removes products from the material handling means. A control means positions the sets such that, while one set is receiving products from the feed means, a second set is being moved into position to receive additional products from the feed means.

This invention provides a conveyor system and method capable of handling products for packaging at ultra-high speeds; that is, speeds in excess of about 400 units/minute. This invention minimizes the problem of product jams; that is, product not being handled in an orderly fashion and being crumpled or destroyed in the process. The conveyor system of this invention also can be easily adjusted to handle products of different sizes and product delivery from different angles.

This invention also provides a conveyor system that can be adapted to deliver the product in either vertical stacks for packaging in polymer bags or in horizontal groups for packaging in cartons.

Other objects and advantages of the present invention will become more apparent to those skilled in the art in view of the following description and the accompanying drawings.

BRIEF DESCRIPTION OF THE DRAWINGS

FIG. 1 is a side plan view partially in section of a conveyor system of this invention in which material handling set 16 is receiving product from the feeder and material handling set 24 is ready to begin accepting products.

FIG. 2 is an end view partially in section of the conveyor system of FIG. 1 viewed from the right along the plane of line II—II.

FIG. 3 is a side plan view partially in section of a conveyor system of this invention in which material handling set 16 is unloading product and material handling set 24 is accepting product.

FIG. 4 is a side plan view partially in section of a conveyor system of this invention in which material handling set 24 is finishing accepting product and material handling set 18 is immediately behind set 24.

FIG. 5 is a side plan view partially in section of a conveyor system of this invention in which material handling set 24 is unloading product and following set 18 is accepting product.

FIG. 6 is a side plan view partially in section of a conveyor system of this invention in which material handling set 24 has just finished unloading product and material handling set 18 is accepting product.

FIG. 7 is a side plan view partially in section of a conveyor system of this invention in which material handling set 18 is in the process of unloading product and material handling set 26 is beginning to accept product.

FIG. 8 is a side plan view partially in section of a conveyor system of this invention in which a conveyor system of this invention has completed one sequence and is in the process of starting another operating sequence.

FIG. 9 is a cross section of an apparatus of the invention taken along the plane of line IX—IX of FIG. 8.

FIG. 10 is a cross section of an apparatus of the invention taken along the plane of line X—X of FIG. 6.

FIG. 11 is a perspective view of an alternate conveying system of the invention.

FIG. 13 is a fragmentary view of a modified apparatus of FIG. 11.

DETAILED DESCRIPTION OF THE PREFERRED EMBODIMENTS

Figure 12:
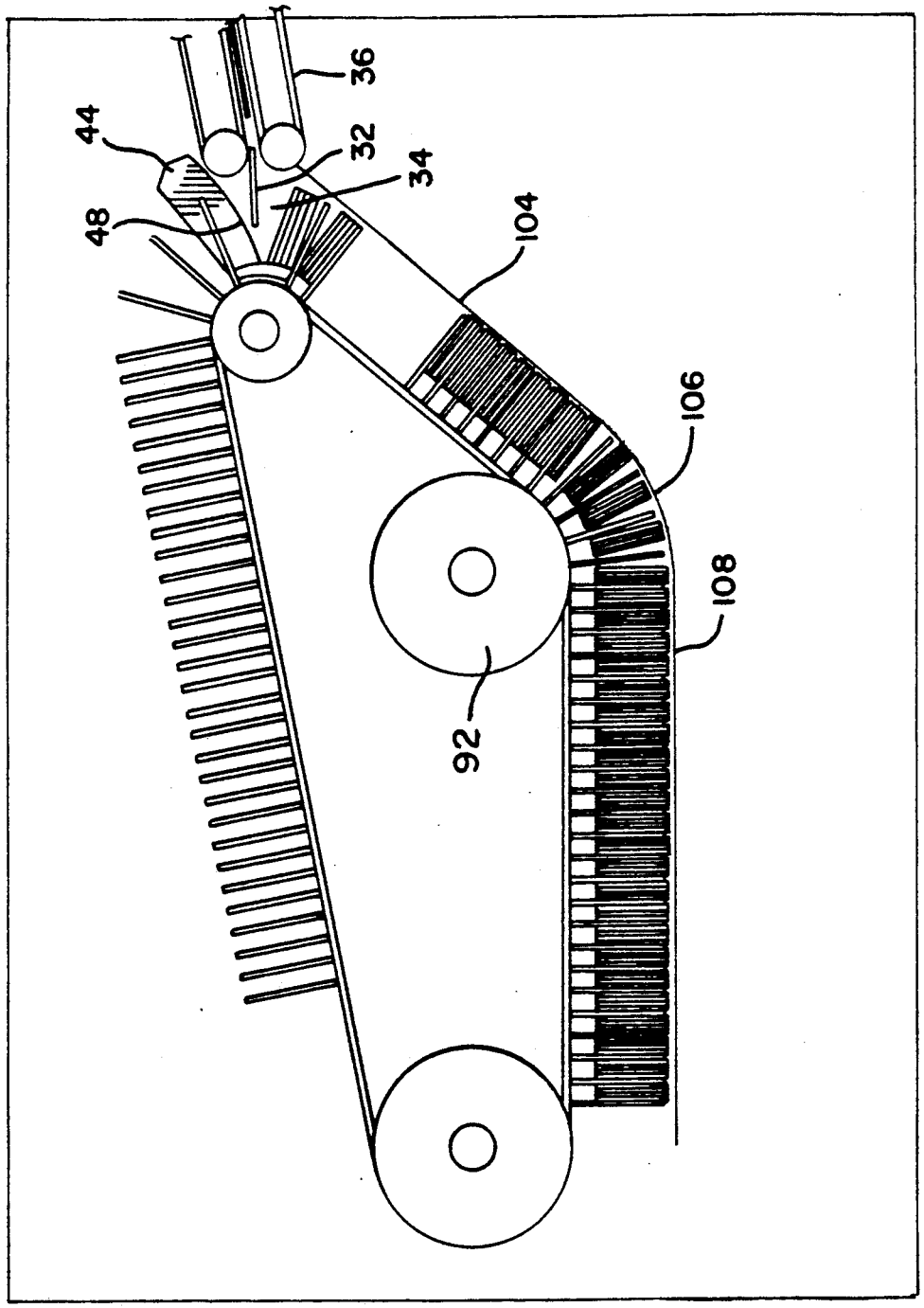
FIG. 12 is a fragmentary side view of the apparatus of FIG. 11.

The conveyor system 10 (FIG. 1) of this invention has two parallel continuous conveyor belts 12 and 14 (FIGS. 2, 9 and 10). Conveyor belt 12 carries two sets 16, 18 of material handling means or platens 20, 22; and conveyor belt 14 carries two sets 24, 26 of platens 28, 30. Preferably, each set on a conveyor belt is equidistant from the other set on that conveyor belt. Each platen 20, 22, 28 and 30 is forked with two tines 46 per platen. The platens and tines can have different shapes to accommodate product 32 of different configurations. For example, to accept a folded, individually wrapped sanitary napkin, the preferred platen measures about 4 inches wide by 3.5 inches long, with individual tines having the same length and tapered width varying from about 1.75 inches at the base to about 1.5 inches at the tip. Alternately, to accept panty liners, which are neither folded nor wrapped, the preferred platen measures about 2 inches wide by about 7.5 inches long, with individual tines having the same length and tapered width varying from about 0.75 inches at the base to about 0.375 inches at the tip.

In operation, conveyor belt 12 moves set 16 into position for accepting products 32 (e.g. feminine napkins) from a feeder 36 (FIG. 1). Conveyor belt 12 then moves each platen 20 in set 16 in succession so that a single product 32 is placed in the space 34 between adjacent platens 20. Feeder 36 feeds products 32 at a rate so that spaces 34 are filled as quickly as spaces 34 pass feeder 36.

As shown in FIGS. 1 and 3, once all the spaces 34 in set 16 are full, set 24, which was positioned immediately behind set 16, is advanced by conveyor belt 14 so that the spaces 38 between platens 28 are successively filled with products 32 by feeder 36 (FIG. 3). While conveyor belt 14 is advancing platens 28 to fill set 24, conveyor belt 12 is doing two thins: a) it moves set 16 to an unloading area 40 where the group of products 32 is set 16 is unloaded; and b) it advances set 18 to a position behind set 24 so that set 18 will be the next set to be loaded after set 24 is loaded.

In FIGS. 4 and 5 it may be seen that, once set 24 is fully loaded, conveyor belt 14 moves set 24 to an unloading area 40, while conveyor belt 12 advances set 18 under feeder 36. After set 18 is loaded and set 24 is unloaded, set 26 is loaded and set 18 is unloaded. After set 26 is loaded, conveyor belt 14 advances it to the unloading area, and conveyor belt 12 carries set 16 under feeder 36 to repeat the process all over again.

As shown in FIG. 5, as one set is accepting products, another set is just behind it ready to accept products, while a third set has just been unloaded and is in the staging area 41. Since the set being loaded is always on a different conveyor belt than the set that is being unloaded, an independent control can be used which causes the set being loaded to move at a different speed than the set being unloaded. During unloading, the conveyor belt may stop or speed up from the speed during loading.

According to FIGS. 1 and 4, the loading of a set 16 is facilitated by a sensor 42 that senses the rate that products 32 exit feeder 36. Sensor 42 is installed so that a pulse is sent to drive means (i.e., motors 78 and 88 in FIG. 2) described below to advance the set being loaded at a speed so that each space 34 will receive a product 32.

As can be seen in FIGS. 1 and 4, the loading of the conveyor is also facilitated by a guide 44. As shown in FIGS. 1, 2 and 11, the guide 44 is a stationary finger that fits between tines 46 on each platen 20, 22, 28 and 30 as the splayed platens pass feeder 36. Guide 44 has a curved leading edge 48 that forms a progressively narrowing space 34 between leading edge 48 and the back of the preceding platen (e.g. platen 50 in FIG. 1). The narrowing of the space 34 under feeder 36 allows feeder 36 to eject products 32 at high speed into the space. The wide opening of space 34 accepts the arriving high-speed product 32; the curved edge 48 guides the product 32 into the bottom of the space where the narrow bottom slows and traps the product 32, which is thus prevented from bouncing out of the space. Preferably, leading edge 48 is curved to form an acute angle with the incoming product 32. The acute angle deflects and slows the product 32 as the leading edge 48 directs the product 32 into the space 34 between adjacent platens.

Preferably, the platens 20, 22, 28 and 30 are splayed as they pass under the feeder 36. Splaying is done by passing the conveyor belts 12 and 14 around a tight radius such as gears 52 and 54. The splaying allows the products 32 to be more easily inserted into the spaces 34. In certain circumstances, described in detail below in connection with FIGS. 11 and 12, the splaying allows large compressible products 32 to be inserted into the spaces 34 so that, when the platens 20, 22, 28 and 30 holding the products 32 reach a straight (non-curved) portion of the path followed by the conveyor, the platens will compress the products 32. The compressed products 32 can be unloaded and packaged in a compressed state, accordingly.

Because the products 32 in the splayed platens are travelling in a curvilinear path around the gears 52 and 54 at a very high speed, there is a tendency for the products 32 to move in a straight line away from the gears and out of the spaces 34. Thus, a curved guard 56 (FIGS. 1–8) is positioned around the conveyor system 10 extending around the gears 52 and 54 and between the feeder 36 and the unloading area 40. Accordingly, the tendency for the products 32 to move in a straight line causes them to move away from the gears 52 and 54 and outward toward the guard 56. The guard 56 terminates in a straight portion 58 that guides the products 32 in a straight path downward onto a vertical stack transfer means 60, where the products 32 from one set 16, 18, 24 or 26 of platens form a single vertical stack 62, as shown in FIG. 5.

As shown, for example, in FIGS. 1 and 3, a removal means 64 (e.g., a stationary finger or stripper) is positioned in the unloading area 40 and passes between the tines 46 of the platens as the platens complete their arcuate journey around the gears 52 and 54 and begin to travel a straight path 66 to the gears 68 and 70. The removal means 64 has an angled edge 72 that contacts the products 32 so that the products 32 are positioned between the straight portion 58 of the guard 56 and the angled edge 72. As a set 16, 18, 24 or 26 of platens moves past the removal means 64, the products 32 so positioned are stripped from the set and fall in a stack 62 (FIG. 5) onto the vertical stack transfer means 60. This transfer means 60 then carries the stack 62 to a conveyor belt 64 (FIG. 5) that carries the stacked products 32 to a packaging means (not shown) which packages stacks of products into cartons (a cartoner). The transfer means 60 then returns to the position shown in FIG. 3 to accept another product stack 62 stripped from the following set of platens. Each time a set of platens is stripped of products, the transfer means 60 moves the product stack 62 to the conveyor belt 74. A sensor 84 can detect whether a full product stack 62 has been accumulated and cause an incomplete product stack to be shunted to another location (not shown).

As shown in FIGS. 1 and 2, the conveyor belt 12 carries platen sets 16 and 18, and the conveyor belt 14 carries platen sets 24 and 26. The conveyor belt 12 is driven independently of the conveyor belt 14 by a drive gear 52, while the conveyor belt 14 is driven independently of the conveyor belt 12 by a drive gear 54 located directly adjacent to the gear 52. The conveyor belts 12 and 14 are toothed conveyor belts (e.g., Uniroyal Power Grip HTD Belts).

As shown in FIG. 2, the gear 54 is driven by a shaft 76 that is rotated by the motor 78 via a belt 80. The gear 52 is driven by a tubular shaft 82 through which the shaft 76 extends. The tubular shaft 82 is rotated by the motor 88 via a belt 90. Because the conveyor belts 12 and 14 are independently driven by the motors 88 and 78 respectively, the two conveyor belts 12 and 14 can move at different rates, e.g., the conveyor belt 12 speeds up to strip a product stack 62 as described above, while the conveyor belt 14 maintains a constant speed as set 24 or 26 accepts products 32 from the feeder 36.

FIGS. 1 and 2 show the conveyor belts 12 and 14 being carried by the independent follower gears 68 and 70, respectively. Thus, the conveyor belts 12 and 14 extend between the drive gears 52 and 54 and the follower gears 68 and 70, respectively.

As shown in FIGS. 9 and 10, the conveyor belts 12 and 14 ride in channeled guides 94. Each channeled guide 94 has a pair of channels 96 and 98 on which the conveyor belts 12 and 14 travel, respectively.

As shown in FIGS. 9 and 10, the platens 20 and 22 are attached to the conveyor belt 12 by an arm 100 that is on the lower left of FIG. 9. This allows the platens 20 and 22 to be centered on the channelled guide 94. Similarly, the platens 28 and 30 are attached to the conveyor belt 14 by an arm 102 that is on the lower right of FIG. 10. This allows the platens 28 and 30 to be centered on the channelled guide 94 as well. Thus, the platen 20 and 22 of the sets 16 and 18 on the conveyor belt 12 travel the same path around the conveyor system 10 as the platen 28 and 30 of the sets 24 and 26 on the conveyor belt 14. To accommodate different product configurations and different numbers of products between platens, different sizes and shapes of platens may be attached to the conveyor belts 12 and 14.

With few adjustments, the conveyor system 10 can also be used to unload products in a horizontal group and to group and compress products in a fashion suitable for packaging in polymer bags. In this configuration, the conveyor system 10 has an elongated guard, see FIG. 11, and a rounded guard 106, see FIG. 12. It should be understood that the product 32 may be loaded anywhere on the upper right curve portion of FIG. 11, which means that the guard 56 need cover only that portion of the curve where the products 32 travel after being loaded. For loading at other points on the arc, the guide 44 is positioned so that the products 32 leaving the feeder 36 contact the guide 44 and decelerate, as explained above. More than one product 32 can be fed into a single space between splayed platens. In this embodiment, the conveyor belts 12 and 14 have a triangular configuration to provide two linear paths between loading and unloading.

After the product 32 is loaded into the spaces 34 when the platens are in a splayed configuration, a platen set moves along a first linear path 104 as shown in FIG. 12, where the spaces 34 between adjacent platens decrease and compress the products 32 as described above. Next, the platens pass around a gear 92 inside the curved guard 106, where the platens again splay, increasing the space between adjacent platens. Because the curved guard 106 is below the conveyor belts 12 and 14, the products 32 in the spaces 34 tend to drop onto the curved guard 106. This assures precise alignment of the products 32 against the curved guard 106. Then, the platens pass to a second linear path 108, where the platens are no longer splayed, but are closer together and again compress the products 32. The repeated compression and alignment precisely align the products 32 for accurate grouping and high-speed packaging.

As shown in FIGS. 11 and 13, at the end of the second linear path 108, a platen set enters a horizontal unloading area 110. In this area, the conveyor belts 12 and 14 intermittently stop and unload. In one embodiment, only a portion of the products 32 in one platen set, are unloaded at a time. Then, the conveyor belt 12 or 14 advances, stops and unloads another group of the products 32. In a more preferred embodiment, all the products 32 in one platen set, are unloaded at one time.

As shown in FIGS. 11 and 13, at the horizontal unloading area 110, the products 32 are unloaded by a removal means. Preferably, the products 32 are pushed out of the spaces 34 by prongs 112 that register with the spaces 34. The prongs 112 are attached to a carrier 114, see FIG. 13, and are actuated by movable arms 116 and 118 that ride in bearings 120 and 122, respectively. The arms 116 and 118 are moved by a drive mechanism (not illustrated). The prongs 112 push a horizontal group of compressed products 124 onto a table 126 that has two parallel, vertical walls 128 and 130. The walls 128 and 130 keep the product group 124 erect and compressed.

The compressed products 124 may optionally be divided by a divider 132 into subgroups 134 as the prongs 112 push the compressed products 124 onto the table 125, see FIG. 13.

As shown in FIG. 11, the products 124 are removed from the table 126 by reciprocating movement devices 138 and 140 that have down-turned ends 142 and 144, respectively. The movement devices 138 and 140 ride in tandem or independently on fixed, parallel rails 146 and 148. The movement device 138 slides the compressed products 124 to the edge of the table 126, and the movement device 140 slides the products onto an accumulator conveyor 149. The conveyor 149 has spaced walls 150 between which the compressed products 124 or 134 are pushed to keep the products compressed. The conveyor 149 and the movement device 140 operate so that one or more groups of compressed products 124 or 134 can be placed between each pair of walls 150 so that one or more groups can be packaged together.

The conveyor system 10 may be further provided with a sensing device 152 that senses missing products in the spaces in order to insure an accurate count in each package. Other sensors may be utilized as needed to regulate the speed of the conveyor belts 12 and 14 as well as to detect improper products that should be discarded.

While the invention has been illustrated with the receiving, collection and transport of individual products, it could be utilized for transport of any material for collection and packaging. Typically such material would include diapers, sanitary napkins, panty liners, incontinence garments, candy, canned goods, bottled goods or any other product that is produced individually and packaged in groups. As described above, differently shaped platens can be substituted to accept these products. Also, while the conveyor belts 12 and 14 have been shown to have one or two sets of platens each, this invention can be constructed having more than two sets of platens on a conveyor belt or additional conveyor belts. While several embodiments have been illustrated, the invention is only intended to be limited by the breadth of the claims attached hereto.

I claim:

1. A conveyor system comprising:
   a) two independently driven conveyor belts each having two sets of material handling members attached thereto, said conveyor belts being disposed to move said sets of material handling members along the same path;
   b) feed means for directing products between adjacent material handling members which are spaced apart;
   c) removal means for removing said products from said material handling members at a location displaced from said feed means to an unloading area; and
   d) positioning means for positioning a first of said sets of material handling members to receive products from said feed means while a second of said sets is being moved into position to receive additional products from said feed means, while a third of said sets is unloading and a fourth of said sets is in a staging area, said first and fourth sets being on one conveyor belt and said second and third sets being on said other conveyor belt.

2. The conveyor system of claim 1 wherein a staging area situated between said removal means and said feed means.

3. The conveyor system of claim 2 wherein each set of material handling members on a conveyor belt is equidistant from the other set or sets on said same conveyor belt.

4. The conveyor system of claim 1 wherein said material handling members are spread while receiving products.

5. The conveyor system of claim 4 wherein said material handling members are spread apart by passing said respective conveyor belt around a curve.

6. The conveyor system of claim 1 wherein said material handling members are forked and each has at least two tines.

7. The conveyor system of claim 6 wherein said removal means passes between said tines.

8. The conveyor system of claim 1 wherein said guide means comprises a curved device.

9. The conveyor system of claim 8 wherein said guide means forms an acute angle with the product.

10. The conveyor system of claim 8 wherein said guide means and said removal means are integral.

11. An apparatus for collecting products, comprising:
    a) two independently driven conveyor belts each having two sets of material handling members attached thereto, said conveyor belts being disposed to move said sets of material handling members along the same path;
    b) feed means for feeding said products between adjacent material handling members which are splayed by passing said conveyor belts around a curve;
    c) removal means for removing said products from said material handling members at a location displaced from said feed means, said removal means including prongs which move said products to an unloading area; and
    d) positioning means for positioning a first of said sets of material handling members to receive products from said feed means while a second of said sets is being moved into position to receive additional products from said feed means, while a third of said sets is unloading and a fourth of said sets is in a staging area, said first and fourth sets being on one conveyor belt and said second and third sets being on said other conveyor belt.

12. The apparatus of claim 11 wherein said unloading area has means for dividing the group of unloaded products into subgroups.

13. The apparatus of claim 11 wherein said apparatus further comprises at least one means for moving a product group across said unloading area away from said prongs and for accommodating a second product group being moved onto said unloading area.

14. The apparatus of claim 13 further comprising an accumulator conveyor capable of moving said product groups from said unloading area.

15. The apparatus of claim 14 further comprising packaging means for placing said product groups into packages, said packaging means capable of moving said product groups off said unloading area.

16. The apparatus of claim 11 further comprising guard means situated between said guide means and said removal means, said guard means enclosing said material handling members and said products on at least one side.

17. The apparatus of claim 16 wherein said guard means encloses said material handling members and said products on at least two sides.

18. The apparatus of claim 16 wherein said guard means encloses said material handling members and said products on three sides.

19. The apparatus of claim 11 wherein said control means moves said conveyor belt faster for unloading a vertical stack of products or stops said conveyor belt for unloading of a horizontal group of products.

20. The apparatus of claim 11 wherein said two sets of material handling means of different configurations are attached to the conveyor belt to accommodate products of different sizes.

21. An apparatus for collecting products, comprising:
   (a) at least two continuous conveyor belts, each belt having at least two sets of material handling means, each set having plural spaced material handling means, said conveyor belts being disposed to move said sets along the same path, said conveyor belts adapted to accommodate material handling means having different configurations to accommodate different numbers and shapes of products;
   (b) means for independently driving each conveyor belt, said independent drive means capable of moving said conveyor belt faster while products are unloaded in a vertical stack and stopping said conveyor belt for unloading in a horizontal group;
   (c) means for feeding products being adjacent material handling means, which are splayed by passing the conveyor belt around a curve, said feed means being upstream from means for guarding said material handling means carrying said products, said guard means preventing product from falling out of the space between adjacent material handling means;
   (d) means for guiding product between adjacent material handling means;
   (e) means for removing said products between said material handling means at a location displaced from said feed means, said removal means comprising prongs which move products from between said adjacent material handling means and onto an unloading area;
   (f) means for positioning a first of said sets of material handling means to receive products from said feed means while a second of said sets is being moved into position to receive additional products from said feed means, while a third of said sets is unloading and a fourth of said sets is in a staging area, the first and fourth sets being on one conveyor belt and the second and third sets being on the other conveyor belt;
   (g) an unloading area having means for dividing said groups of unloaded products into subgroups;
   (h) means for moving a product group across said unloading area away from said prongs to accommodate a second product group being moved onto said unloading area;
   (i) means for moving said first and second product groups onto an accumulator conveyor; and
   (j) an accumulator conveyor for moving groups of articles away from the unloading area and toward a packaging machine.

22. A method for collecting products, said method comprising the steps of:
   (a) providing at least two continuous conveyor belts, each conveyor belt having at least two sets of spaced material handling means, said conveyor belts being disposed to move said sets along the same path, said spaced material handling means being disposed to accept at least one product in the space between adjacent material handling means;
   (b) providing a means for driving each conveyor belt independently of the other, a means for feeding products into said space between material handling means, a means for guiding products into said space between material handling means, and a means for removing products from between said material handling means at a location displaced from said feed means;
   (c) loading said products sequentially between adjacent material handling means in a first set of said sets by spreading said material handling means and passing each of said products across said guide means so as to guide the movement said products;
   (d) advancing said first set of material handling means to said removal means and unloading said products while a second set of material handling means is loaded as in step (c) above;
   (e) repeating step (c) with said third set while repeating step (d) with said second set, while said first set is moved into a staging area;
   (f) repeating step (c) with said fourth set while repeating step (d) with said third set, while the first set is advanced into position behind said fourth set and said second set is moved into said staging area; and
   (g) repeating step (c) with said first set, while repeating step (d) with said fourth set, while said second set is advanced into position behind said first set and said third set is moved into said staging area.

23. The method of claim 22 further comprising the steps of:
   (a) providing a means for transferring a vertical stack;
   (b) positioning said vertical stack transfer means near said conveyor to receive said unloaded products;
   (c) accepting on said vertical stack transfer means products from one set of material handling means in the form of a stack;
   (d) moving said stack on said vertical stack transfer means away from said conveyor; and
   (e) removing said stack from said vertical stack transfer means.

24. The method of claim 22 wherein each of said material handling means includes tines and said guide means and said removal means are located between said tines.

25. The method of claim 22 wherein spreading said material handling means during loading is performed by moving said conveyor belt along a curvilinear path, and loading said products is performed at any point along said curvilinear path where said material handling means are spread.

26. The method of claim 25 wherein the step of loading said product between spaced material handling means comprises loading more than one product into said space.

* * * * *